United States Patent [19]

Merry

[11] 4,110,788

[45] Aug. 29, 1978

[54] MULTIPLE WAVELENGTH ACOUSTOOPTIC DEFLECTION

[75] Inventor: J. Bradford Merry, Rochester, N.Y.

[73] Assignee: Eastman Kodak Company, Rochester, N.Y.

[21] Appl. No.: 785,281

[22] Filed: Feb. 22, 1977

Related U.S. Application Data

[63] Continuation of Ser. No. 670,771, Mar. 26, 1976, abandoned.

[51] Int. Cl.² .......................... H04N 9/14; G02F 1/24
[52] U.S. Cl. ....................................... 358/63; 350/235
[58] Field of Search .................. 358/60, 61, 63, 62, 358/235; 350/161 W, 235

[56] References Cited

U.S. PATENT DOCUMENTS

| | | | |
|---|---|---|---|
| 3,524,011 | 8/1970 | Korpel | 358/60 |
| 3,743,970 | 7/1973 | Bonner et al. | 350/161 W |
| 3,783,185 | 1/1974 | Spaulding | 350/161 W |
| 4,037,933 | 7/1977 | Yano et al. | 350/161 W |

OTHER PUBLICATIONS

Uchida et al., "Acoustooptic Deflection Materials and Techniques," *Proc. of IEEE*, vol. 61, No. 8, Aug. 1973, pp. 1073-1092.

Warner et al., "Acoustooptic Light Deflectors Using Optical Activity in Parateilurite," *J. Appl. Phys.*, vol. 43, No. 11, Nov. 1972, pp. 4489-4495.

Dixon, "Acoustic Diffraction of Light in Anisotropic Media," *IEEE Journal of Quantum Electronics*, vol. QE-3, No. 2, Feb. 1967, pp. 85-93.

*Primary Examiner*—John C. Martin
*Attorney, Agent, or Firm*—Warren W. Kurz

[57] ABSTRACT

Traveling acoustic waves, in an acoustooptic cell which exhibits an anisotropic diffraction mode, diffract a portion of polychromatic light passing through the cell. The acoustic waves are generated by electro-mechanical transducer means powered by electrical signals having a frequency component for each optical wavelength, and each frequency component can be varied over a bandwidth chosen such that light of optical wavelengths not associated with that frequency component is diffracted with an intensity a predetermined amount less than the intensity of the diffracted light of the optical wavelength associated with that frequency component. Each acoustic wave frequency component may be synchronized with the other frequency components such that the diffracted beams remain collinear throughout their scan, and the bandwidth of each frequency component can be chosen such that the angles of diffraction of light of all wavelengths are substantially equal.

7 Claims, 4 Drawing Figures

MULTIPLE WAVELENGTH ACOUSTOOPTIC DEFLECTION

CROSS-REFERENCE TO RELATED APPLICATIONS

This is a continuation of application Ser. No. 670,771 filed Mar. 26, 1976, now abandoned.

BACKGROUND OF THE INVENTION

1. Field of the Invention

This invention relates to an acoustooptic device for diffracting polychromatic light, and more particularly to such a system for effectively producing a single output beam of each optical wavelength by using (1) an acoustooptic cell which exhibits an anisotropic diffraction mode and (2) properly chosen incident angles and acoustic frequency bandwidths.

2. Description of the Prior Art

It is well-known in the art that when an acoustic beam of wavelength $\Lambda$ interacts with a light beam of wavelength $\lambda$, the former acts as a diffraction grating of spacing $\Lambda$ which diffracts the light beam at an angle $\phi$ approximately by $$\phi = \lambda/2\Lambda = \lambda f/2V \qquad (1)$$

where $V$ and $f$, respectively, are the acoustic velocity and frequency. Efficient Bragg diffraction occurs when the distance across the sound beam in the direction of the light path is greater than $(\Lambda^2/\lambda)$. The Bragg condition is satisfied when the incident angle $\theta$ is equal to $\phi$.

Since the diffraction angle depends on the acoustic frequency $f$, it is possible to vary the direction of diffracted light by changing $f$. If in equation (1), $f$ is changed by an amount $\Delta f$, the angle of diffraction of the light beam will change by $$\Delta\phi = \lambda/V\Delta f \qquad (2)$$

It can be shown that the number of spots N resolvable by the scanned beam is $$N = (D/V)\Delta f = \tau\Delta f \qquad (3)$$

where D is the aperture of the incident light beam and $\tau$ is the access time, i.e., the time required for the acoustic wave to cross the aperture. The reader is referred to the PROCEEDINGS OF THE IEEE, Vol. 54, No. 10, 1966, page 1430 for a derivation of equation (3).

As stated hereinbefore, to obtain Bragg diffraction, the incident and diffracted beams should be symmetrical with respect to the acoustic wavefront. For a given incident angle and optical wavelength, the diffraction angle will be equal to the incident angle only when the acoustic frequency is at a specific value $f_o$. If the direction of the diffracted beam is changed by changing the acoustic frequency from $f_o$, the angle of incidence of the incident beam should also be changed to restore symmetry and maximum diffraction efficiency.

Commonly assigned, U.S. Pat. No. 3,783,185, which issued on Jan. 1, 1974 to R. A. Spaulding, discloses an acoustooptic modulator which produces a composite output beam comprising a plurality of diffracted collinear component beams of selected wavelengths. Light containing several wavelengths is impinged upon an acoustooptic cell. Electrical signals of different fixed frequencies are generated with amplitudes independently modulated in accordance with a source of color information. The electrical signals are applied to a transducer attached to the cell to generate waves having frequencies which correspond to the individual fixed frequencies in the composite electrical signal. The acoustic wave cause the light impinging thereon to be diffracted in a plurality of the spectra corresponding in number to the fixed frequency signals applied to the transducer. The frequencies of the electrical signals are chosen so as to produce a composite output beam comprising collinear diffracted component beams of selected wavelengths.

However, in the modulator of the Spaulding patent, the angles separating the incident light beams corresponding to each fixed acoustic frequency are small. Since each acoustic frequency will diffract the incident light of each beam with an efficiency inversely proportional to the angle that beam makes with the optimum incident angle for that frequency, there will exist high intensity "cross talk" resulting in multiple diffracted beams from each frequency impressed on the acoustooptic cell. In other words, if red, green and blue light is impinged on the cell at incident angles optimum for three fixed acoustic frequencies, each frequency will cause a different angle of diffraction for each color light, resulting in nine beams (three red, three green and three blue), only one beam of each color being within the composite output beam. While the three beams making up the composite beam will be of the highest intensity, the other six beams will be of objectionable intensity and have to be blocked from reaching the output target.

While the Spaulding acoustooptic cell is practical for a modulator, where the angle of diffraction of the composite beam is fixed, it is apparent that such a device could not be used as a deflector since the six light beams outside of the composite output beam would also be diffracted at varying angles if the acoustic frequencies were not fixed. To provide a scanning light beam comprising a plurality of optical wavelengths, Spaulding employs a slotted mask to block the unwanted beams. The composite beam which passes the mask is then deflected or scanned by conventional means such as by a rotating prism.

In 1967, it was predicted by R. W. Dixon that, when the incident light beam is made to propagate perpendicular to the optic axis of a uniaxial birefringent crystal, deviations will occur from isotropic Bragg diffraction. In an article entitled "Acoustic Diffraction of Light in Anisotropic Media" in the IEEE Journal of Quantum Electronics, QE-3, 85 (1967), he indicated that one such deviation was that the angle of incidence $\theta$ no longer was constrained to approximate the angle of diffraction $\phi$. In addition, he pointed out that the angle-of-incidence versus acoustic-frequency characteristic of such deflectors using birefringent media exhibit (1) a decreasing incident angle $\theta$ with increasing acoustic frequency $f$ for small values of, (2) an increasing incident angle $\theta$ with increasing acoustic frequency $f$ for large values of $f$, and (3) an inflection point at a frequency $f'$ whereat $d\theta/df = 0$.

FIG. 2 shows experimental results confirming Dixon's prediction, wherein for each of a plurality of acoustic frequencies, the incident angle was varied until the most efficient angle was found. Curve "A" of FIG. 2 is a plot of the most efficient incident angle for each acoustic frequency for light of $\lambda = 0.442$ $\mu$m. Note that the curve exhibits a minimum or inflection point at approximately $\theta' = 3.4°$ and $f = 83$ MHz.

SUMMARY OF THE INVENTION

It is an object of the present invention to provide a method and apparatus for acoustooptically diffracting light of a plurality of optical wavelengths without generating unwanted diffracted beams having intensities requiring them to be blocked from the end use device. By such method and appartus, the output beams can be diffracted to scan the end use device without resorting to supplemental scanning devices.

In accordance with a preferred embodiment of the present invention, light beams of different selected optical wavelengths are impinged upon an acoustooptic cell which exhibits an anisotropic mode of diffraction, that is, a cell in which the angle-of-incident-light versus acoustic-frequency characteristic exhibits an inflection point. A frequency modulated electrical signal associated with each optical wavelength is applied to an electromechanical transducer attached to the cell to produce acoustic waves in the cell. Each electrical signal has a center frequency approximately equal to the inflection point frequency $f$ of its associated optical wavelength and each beam has an incident angle approximately equal to the inflection point angle $\theta'$. By properly choosing the bandwidths of the electrical signals so that none of the acoustic waves formed thereby for diffracting one optical wavelength diffracts the light of another optical wavelength with an intensity greater than the end use device can accept without objectionable results, it will not be necessary to block unwanted diffracted beams. The use of an anisotropic material such as tellurium dioxide makes such a selection in accordance with the present invention possible because the inflection point incident angles for red, green and blue wavelengths are relatively widely spaced. Therefore, an acoustic wave of a frequency adapted to optimumly diffract one of these optical wavelengths will have little effect on a beam of another of such optical wavelengths entering the cell at its inflection point angle $\theta'$.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings in which.

DESCRIPTION OF THE PREFERRED EMBODIMENT

Figure 1:
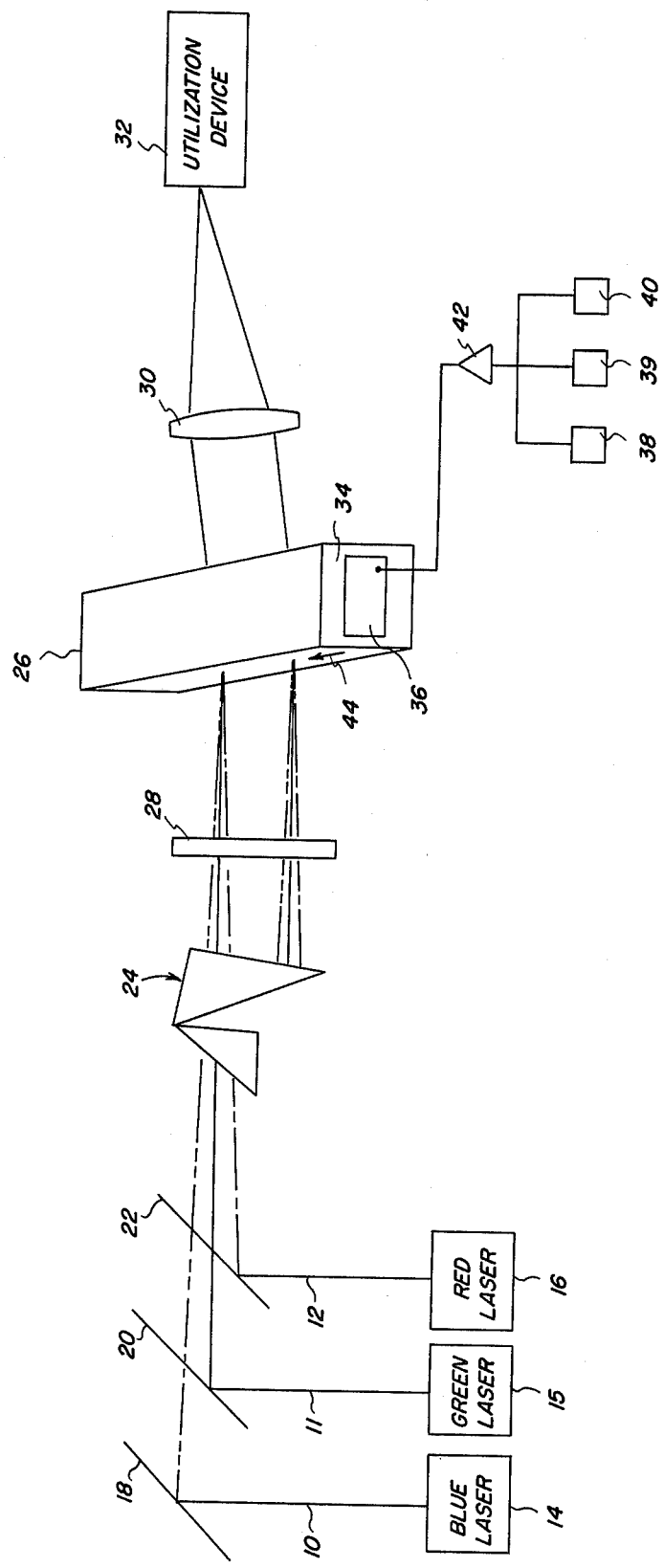
FIG. 1 is a schematic of an illustrative embodiment of the present invention.

Referring to FIG. 1, there is shown schematically a light beam deflection arrangement according to an illustrative embodiment of my invention. Three linearly polarized light beams 10, 11 and 12, respectively, produced by lasers 14, 15 and 16 are reflected by means of a metallic mirror 18 and a pair of dichroic mirrors 20 and 22. Beams 10, 11 and 12 contain, for example blue, green and red wavelengths of light, respectively, and dichronic mirror 20 is designed to pass blue light and reflect green while dichroic mirror 22 is designed to pass blue and green light and reflect red. Alternatively, only two lasers may be used, one being a Kr-ion laser which emits red and green light (0.647 μm and 0.521 μm wavelengths, respectively) and the other being an He-Cd laser which emits blue light (0.442 μm wavelength).

The linearly polarized light beams are expanded along one axis by a system of prisms, shown schematically at 24, to increase the aperture D of the incident light beam on an acoustooptic deflector 26 and thereby to increase the number of resolvable spots N as determined by equation (3). Alternatively, prism system 24 may be replaced by an achromatic cylindrical lens. To increase the efficiency of anisotropic diffraction in deflector 26, the linearly polarized light beams are passed through a quarter-wave plate 28 where the beams are converted to circularly polarized light.

The light beams are focused on deflector 26 which is formed of a material having an anisotropic mode of diffraction, such as crystalline $TeO_2$. After the light beams and acoustic waves interact in deflector 26, the deflected beams are focused onto a utilization device 32 by an optical system (schematically shown at 30), such as cylindrical lenses or prisms, which will be used to make the output beam circular again.

Deflector 26 is provided at one end 34 with an electromechanical transducer 36, and optionally, as is conventional, with an acoustic absorber (not shown) at the opposite end. Three independently controlled variable frequency signal generators or synchronized oscillators 38, 39 and 40 provide electrical signals which are combined by summing amplifier 42 and applied to transducer 36, which in turn vibrates with three frequency components $f_1$, $f_2$ and $f_3$ to produce in cell 26 an acoustic wave that propagates in the direction of vector 44.

The three incident light beams 10, 11 and 12 enter deflector cell 26 at or near to their respective inflection point angles $\theta'$ to the normal to the direction of propagation of the acoustic waves. The incident light beams are diffracted by the acoustic waves.

Figure 2:
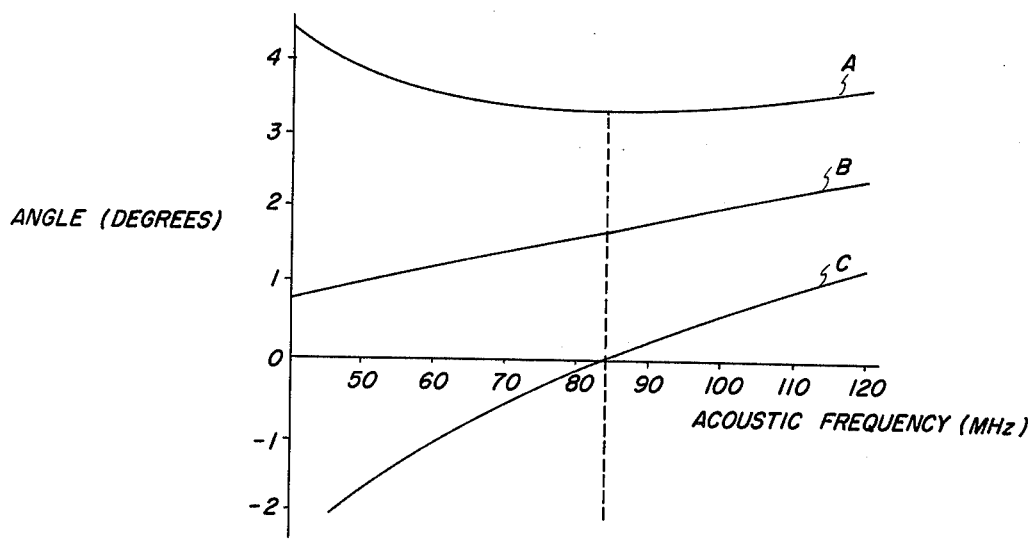
FIG. 2 is a graph of the optimum incident and corresponding deflection angles-versus-acoustic frequency for both normal Bragg deflection and anisotropic deflection.

It will be recalled that curve A in FIG. 2 is a plot of the most efficient incident angle for each acoustic frequency over a range of frequencies for a light beam of $\lambda = 0.422$ μm. The curve exhibits an inflection or minimum point at $\theta' = 3.4°$ and $f = 83$ MHz.

For a given optical wavelength, there is only one inflection point angle and frequency. For example, in the specific illustrative example of three incident beams 10, 11 and 12 of 0.647 μm, 0.521 μm and 0.442 μm wavelengths, the respective inflection point angles are 2.26°, 2.74° and 3.40° and the respective inflection point frequencies are 38 MHz, 57 MHz and 83 MHz.

By maintaining the incident angle at the inflection point angle $\theta'$ and varying the frequency of the signal applied to transducer 36, the angle that the deflected beam makes with the normal to the direction of travel of the acoustic waves may be measured. Curve "C" of FIG. 2 is such a plot for the light beam having a wavelength of 0.442 μm. Note that at the inflection point frequency 83 MHz, the diffracted beam is substantially perpendicular to the direction of acoustic wave propagation. In the figure, a curve, labeled "B", has been shown to indicate both the angle of incidence and the angle of diffraction for isotropic Bragg deflection. As mentioned, curves "A" and "C" are for a beam of wavelength 0.442 μm. Similar curves can be plotted for light beams of 0.647 μm and 0.521 μm. If this were done, it would be apparent from the plots that, for a tellurium dioxide diffraction cell, the inflection point incident angles and acoustic frequencies would differ significantly for each wavelength. Thus, if two beams of different colors (e.g. red and green) were entering a TeO₂ anisotropic cell at their respective inflection point angles $\theta'_1$ and $\theta'_2$, the inflection point frequency $f'_1$ for one such beam would have little diffracting effect on the other beam since the incident angle $\theta'_2$ of the other beam would be far from optimum for acoustic frequency $f'_1$.

Figure 3:
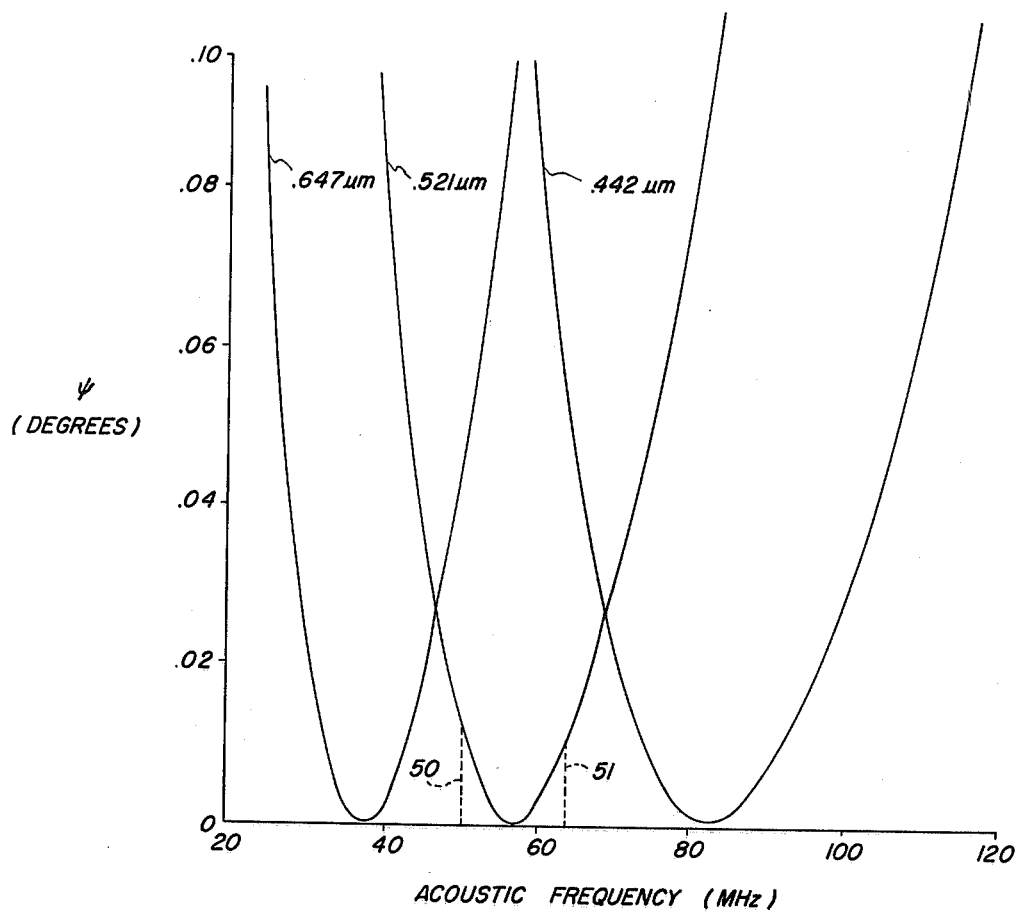
FIG. 3 is a graph of the deviation of the optimum incident anisotropic angle from the inflection point angle.

FIG. 3 is a plot of difference between the most efficient incident angle at each acoustic frequency (curve "A" in FIG. 2) and the inflection point angle $\theta'$ (3.40° in FIG. 2) for each selected optical frequency. This angular difference is denoted by the symbol $\psi$ and will be used to find the maximum frequency bandwidths attainable for each oscillator before cross talk between the acoustic wave intended to diffract one optical wavelength diffracts another wavelength with an unacceptable intensity. This maximum bandwidth, of course, determines the maximum angle through which the diffracted beams are capable of being deflected. By proper selection of the individual frequency bandwidths and the interaction length L of the acoustic diffraction cell, such cross talk can be held to an acceptable level.

What is meant by an acceptable level of cross talk is an amount not in excess of what would cause objectionable results in the particular utilization device 32. For instance, if the utilization device produces color images on photographic film, it has been found that, in many instances, by providing at least about a 13 dB difference in the intensity of the desired beam and an undesired beam, the final image on the film caused by the undesired beam will not be noticeable in most practical applications.

The ratio $I_o/I_i$ of the output intensity to the input intensity of each optical wavelength is given by $$\frac{I_o}{I_i} \propto \left( \frac{\sin \pi \frac{\psi}{\Lambda/L}}{\pi \frac{\psi}{\Lambda/L}} \right)^2 \quad (4)$$

Accordingly, the ratio $I_b/I_g$ of the output intensity of, say, the blue beam to the green beam is given by $$\frac{I_b}{I_g} \propto \left( \frac{\sin \pi \frac{\psi_b}{\Lambda/L}}{\pi \frac{\psi_b}{\Lambda/L}} \right)^2 \cdot \left( \frac{\pi \frac{\psi_g}{\Lambda/L}}{\sin \pi \frac{\psi_g}{\Lambda/L}} \right)^2 \quad (5)$$

$$\propto \left( \frac{\psi_g \sin \pi \frac{\psi_b}{\Lambda/L}}{\psi_6 \sin \pi \frac{\psi_b}{\Lambda/L}} \right)^2$$

if we assume that the incident blue and green beams are of equal intensity.

For any given transducer 36 and diffraction cell 26, L will be fixed and $\Lambda$ will be a function of the acoustic frequency. If one wished to find the upper frequency limit for diffracting the green beam while not going below the assumed 13 dB intensity difference between the green and blue beams, he might (referring to FIG. 3) arbitrarily chose a value above 57 MHz. FIG. 3 would then give a value for $\psi_g$ and $\psi_b$. Plugging these values, $\Lambda$ and L into equation 5, the ratio $I_b/I_g$ for that wavelength can be determined. If the ratio is greater than 0.05 (i.e., if there is less tha a 13 dB difference in intensities) one must choose a lower acoustic frequency. If $I_b/I_g < 0.05$, a greater acoustic frequency would be permissible for greater bandwidth. The same method may be used for finding the minimum frequency for diffracting the green beam without exceeding acceptable cross talk with the red beam.

In the illustrative example, where L = 14 mm, the minimum and maximum frequencies for oscillator 39 which will provide at least a 13 dB difference between the 0.521 μm wavelength beam and the 0.647 μm and 0.442 μm wavelength beams, respectively, have been determined in this manner and shown as broken lines 50 and 51 in FIG. 3. These minimum and maximum frequencies are approximately 50 MHz and 63.5 MHz, respectively.

Figure 4:
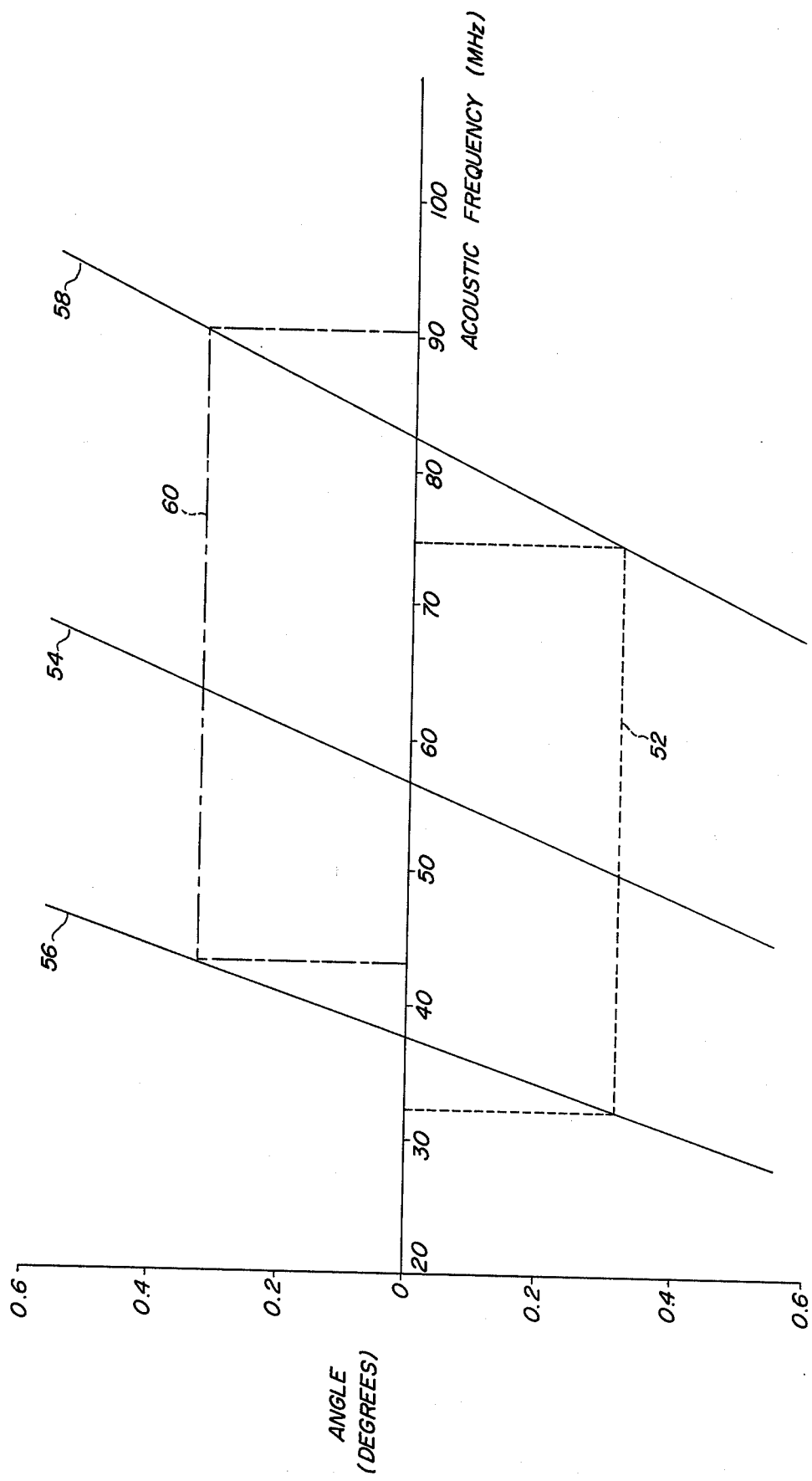
FIG. 4 is a graph of the diffraction angle-versus-frequency.

Since in most applications, it will be desirable for the three beams to scan equal arcs, the frequency limits for oscillators 38 and 40 can be determined from the frequency limits of oscillator 39. In FIG. 4 lines 54, 56 and 58 are plots of the diffraction angle $\phi$ versus frequency $f$ as derived from the equation $\sin \phi = \lambda(f-f')/v$ for the three beams. The minimum frequency of oscillators 38 and 40 to give equal scan angles is determined by drawing a constant scan angle line 52 at the intersection of the plotted 0.521 μm line 54 and the 50 MHz frequency line (50 MHz was the previously determined minimum frequency of oscillator 39 in the illustrated example). The frequency at which line 52 intersects the plotted 0.647 μm line 56 and the 0.442 μm line 58, represent the minimum frequencies of oscillators 38 and 40, respectively. To find the maximum frequencies of oscillators 38 and 40 which would result in equal scan angles, the just described method is followed starting at the intersection of line 54 and the 63.5 MHz frequency line to derive a constant scan angle line 60. Whether these frequencies result in at least the required intensity differences can be confirmed by finding respective values of $\psi$ from FIG. 3 and using equation (5). This process has been carried out, and the frequency limits at which cross talk in the illustrative example is limited to an extent wherein there is at least a 13 dB intensity difference between desired and undesired diffracted light beams are shown in the following table:

| λ( 82 m) | $f\min^{(MHz)}$ | $f\max^{(MHz)}$ | Δf | |
|---|---|---|---|---|
| 0.647 | 32.5 | 43 | 10.5 | |
| 0.521 | 50 | 63.5 | 13.6 | (a) |
| 0.442 | 75 | 91 | 16 | |

The three beams can be maintained co-linear by sweeping the frequencies of oscillators 38, 39 and 40 such that, in FIG. 4, the intersections of the respective frequency and lines 56, 54 and 58 are always horizontally aligned.

By using equation (3) for the number of spots N resolvable by the scanned beams, the resolution of the deflector apparatus can be determined, the resolution being limited by the maximum useful aperture. The primary limiting factor other than cost in determining the maximum size of the aperture is the acoustic attenuation, which should not greatly exceed 6 dB across the aperture. At 90 MHz (approximately $f_{max}$ in table a), the acoustic attenuation is approximately 2 dB/cm in $TeO_2$. Therefore, a 3 cm aperture would be practical. Dividing the aperture by the acoustic velocity (0.0617 cm/μsec in $TeO_2$), it is found that for a 3 cm aperture, $\tau \cong 48$ μsec. The attainable resolution for each beam would be:

| λ(μm) | Δf(MHz) | τ(μsec) | N | |
|-------|---------|---------|-----|-----|
| 0.647 | 10.5 | 48 | 500 | |
| 0.521 | 13.5 | 48 | 650 | (b) |
| 0.442 | 16 | 48 | 770 | |

Thus, it can be seen from the aforegoing that a multiple-color acoustooptic light deflector can be realized by using one acoustooptic cell with a separate acoustic input for each color. By using a deflector which has an anisotropic mode of diffraction and by properly choosing the incident angle, the center frequencies and the frequency ranges, cross talk can be held to an acceptable limit and the deflected beams can be made collinear over the entire scan range.

The invention has been described in detail with particular reference to a preferred embodiment thereof, but it will be understood that variations and modifications can be effected within the spirit and scope of the invention.

I claim:

1. Acoustooptic apparatus for deflecting a plurality of separate monochromatic beams of differing wavelengths through a predetermined angular range, said apparatus comprising:
    (a) an acoustoopic diffraction cell which exhibits an anisotropic mode of diffraction wherein the angle-of-incidence versus acoustic frequency characteristic exhibits an inflection point, for each of said wavelengths, repsectively, at a different, predetermined incidence angle and acoustic frequency;
    (b) electromechanical transducer means operatively coupled to said cell;
    (c) means for generating a plurality of periodic signals, one such signal for each monochromatic beam, the frequency of each such signal being variable over a bandwidth which is outside the bandwidth of the other of said signals, the bandwidth of each such signal having a center frequency approximately equal to the predetermined acoustic frequency for one of said wavelengths;
    (d) means for operatively coupling said signal generating means to said transducer means to vibrate said transducer means and thereby cause acoustic waves to propagate through said cell, said acoustic waves having frequency components proportional the respective frequencies of said periodic signals; and
    (e) means for directing said plurality of monochromatic beams at said cell in a manner such that each beam is incident at its predetermined incidence angle with respect to a plane normal to the direction of acoustic wave propagation.

2. Apparatus as defined in claim 1 wherein said acoustooptic diffraction cell comprises tellurium oxide.

3. Apparatus as defined in claim 1 wherein said bandwidths are chosen such that each of said beams is deflectable through approximately the same angular range.

4. Acoustooptic apparatus for diffracting a plurality of independent monochromatic beams of different, predetermined wavelengths to produce a composite, polychromatic beam, and for deflecting such polychromatic beam through a predetermined angular range, said apparatus comprising:
    (a) an acoustooptic diffraction cell which exhibits an anisotropic mode of diffraction wherein the angle of incident light versus acoustic frequency characteristic exhibits an inflection point, for each of said wavelengths, at a different, predetermined incidence angle and acoustic frequency;
    (b) electromechanical transducer means operatively coupled to said cell;
    (c) means for generating a plurality of periodic signals, one for each monochromatic beams, each signal having a frequency which is variable over a predetermined bandwidth, such bandwidth having a center frequency approximately equal to the predetermined acoustic frequency of one of said wavelengths;
    (d) means for operatively coupling said signal generating means with said transducer means to vibrate said transducer means and thereby cause acoustic waves to propagate through said cell, said acoustic waves having frequency components proportional to the respective frequencies of said periodic signals;
    (e) means for directing said plurality of monochromatic beams at said cell in such a manner that each beam is incident at its predetermined incidence angle relative to a plane normal to the direction of acoustic wave propagation, whereby said monochromatic beams are diffracted at an angle relative to said plane, such angle of diffraction of each monochromatic beam being within said predetermined angular range, and being proportional to the frequency of its respective periodic signal; and
    (f) means for varying the frequency of each of said periodic signals within its respective bandwidth to cause said diffracted beams to be deflected through said predetermined angular range;
    said bandwidths and wavelengths being chosen such that each periodic signal acts, through said diffraction cell, to diffract its respective beam at an intensity which is a predetermined magnitude greater than the intensity at which it diffracts the other beams.

5. Apparatus as defined in claim 4 wherein said acoustooptic diffraction cell comprises tellurium dioxide.

6. Apparatus as defined in claim 4 wherein said bandwidths are chosen such that each of said beams is deflectable through approximately the same angular range.

7. Apparatus as defined in claim 4 wherein said plurality of beams consists of three beams which are red, green, and blue in color, respectively.

* * * * *